United States Patent [19]

Williams

[11] 3,741,127

[45] June 26, 1973

[54] TROLLEY SYSTEM FOR FREIGHT BRACING BULKHEAD ASSEMBLIES

[75] Inventor: Gerald H. Williams, Detroit, Mich.

[73] Assignee: Evans Products Company, Plymouth, Mich.

[22] Filed: Sept. 1, 1971

[21] Appl. No.: 176,973

[52] U.S. Cl. ............................................. 105/376
[51] Int. Cl. ............................................. B60p 7/14
[58] Field of Search ................................. 105/376

[56] References Cited
UNITED STATES PATENTS

| | | | |
|---|---|---|---|
| 3,168,055 | 2/1965 | Vander Hyde et al. | 105/376 |
| 3,369,502 | 2/1968 | Breen et al. | 105/376 |
| 3,464,369 | 9/1969 | Erickson et al. | 105/376 |
| 3,217,664 | 11/1965 | Aquino et al. | 105/376 |
| 3,361,086 | 1/1968 | Kessler | 105/376 |
| 3,384,034 | 5/1968 | Loomis et al. | 105/376 |
| 3,549,291 | 12/1970 | Pettigrew et al. | 105/376 |

Primary Examiner—Drayton E. Hoffman
Attorney—J. King Harness, Ernest A. Beutler, Jr. et al.

[57] ABSTRACT

Two embodiments of freight bracing bulkhead assemblies incorporating improved trolley structures for supporting the bulkhead assemblies for movement along a cargo area and for precluding disengagement of the trolley assembly from the supporting crane rails and for precluding falling of the bulkhead assemblies from these crane rails. In each embodiment the trolley structure includes roller means that supportingly engage a pair of spaced overhead tracks and which are disposed outwardly of the locking pins at the corresponding sides of the bulkhead. The overhead tracks have a generally C-shape and the roller supporting means includes a member that extends in close proximity to the uppermost track leg to preclude inadvertent displacement of the trolley structure relative to the track.

5 Claims, 7 Drawing Figures

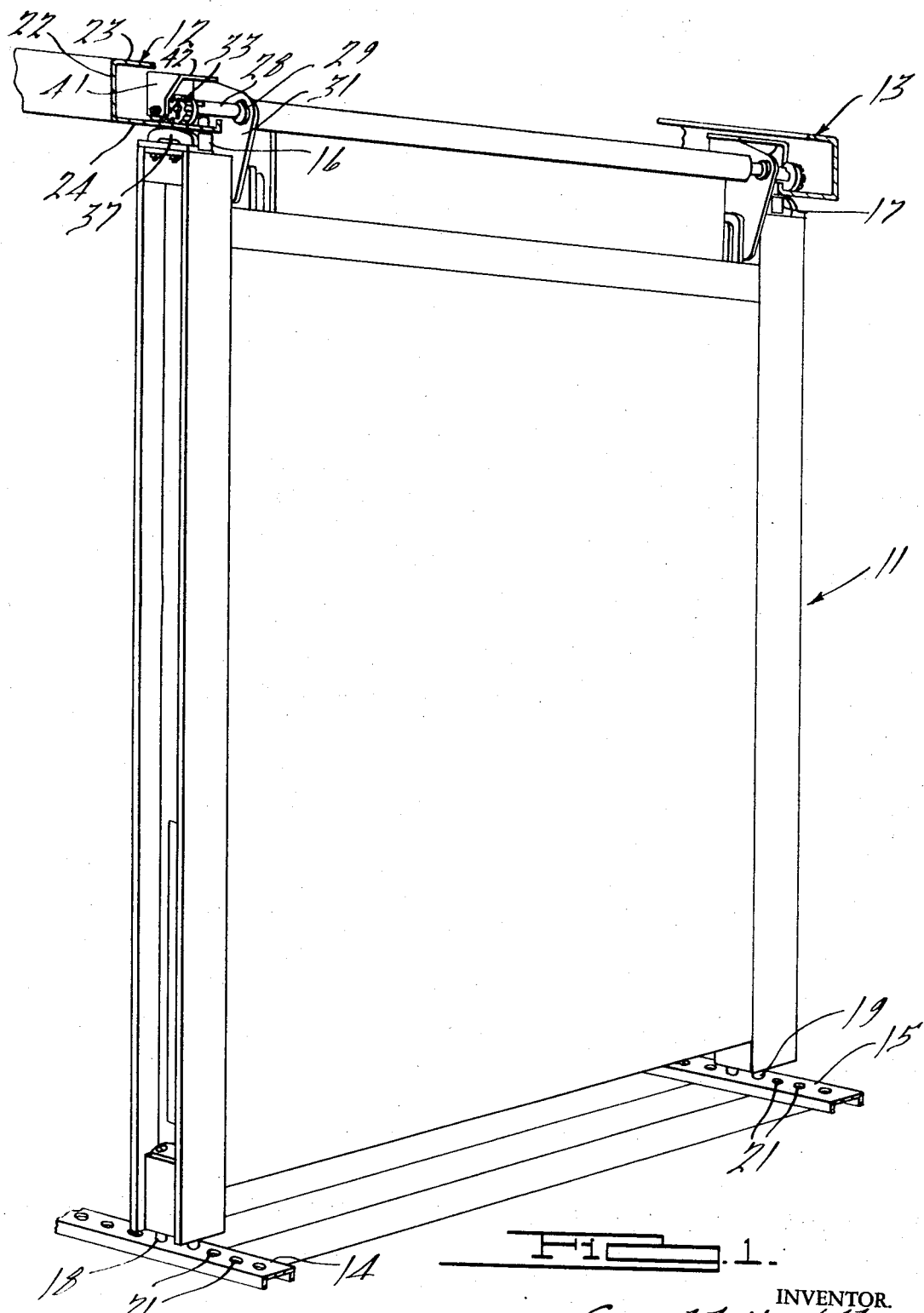

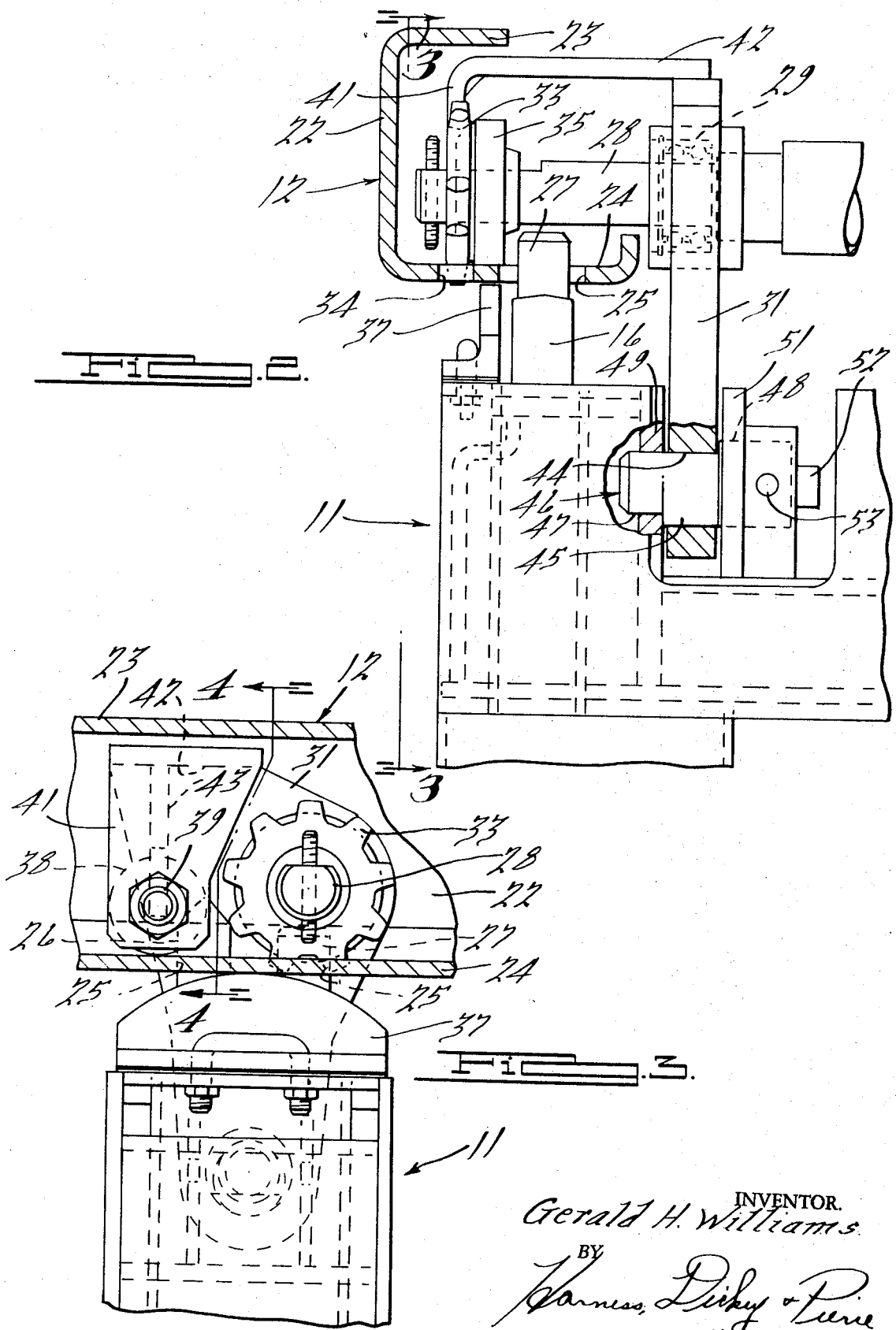

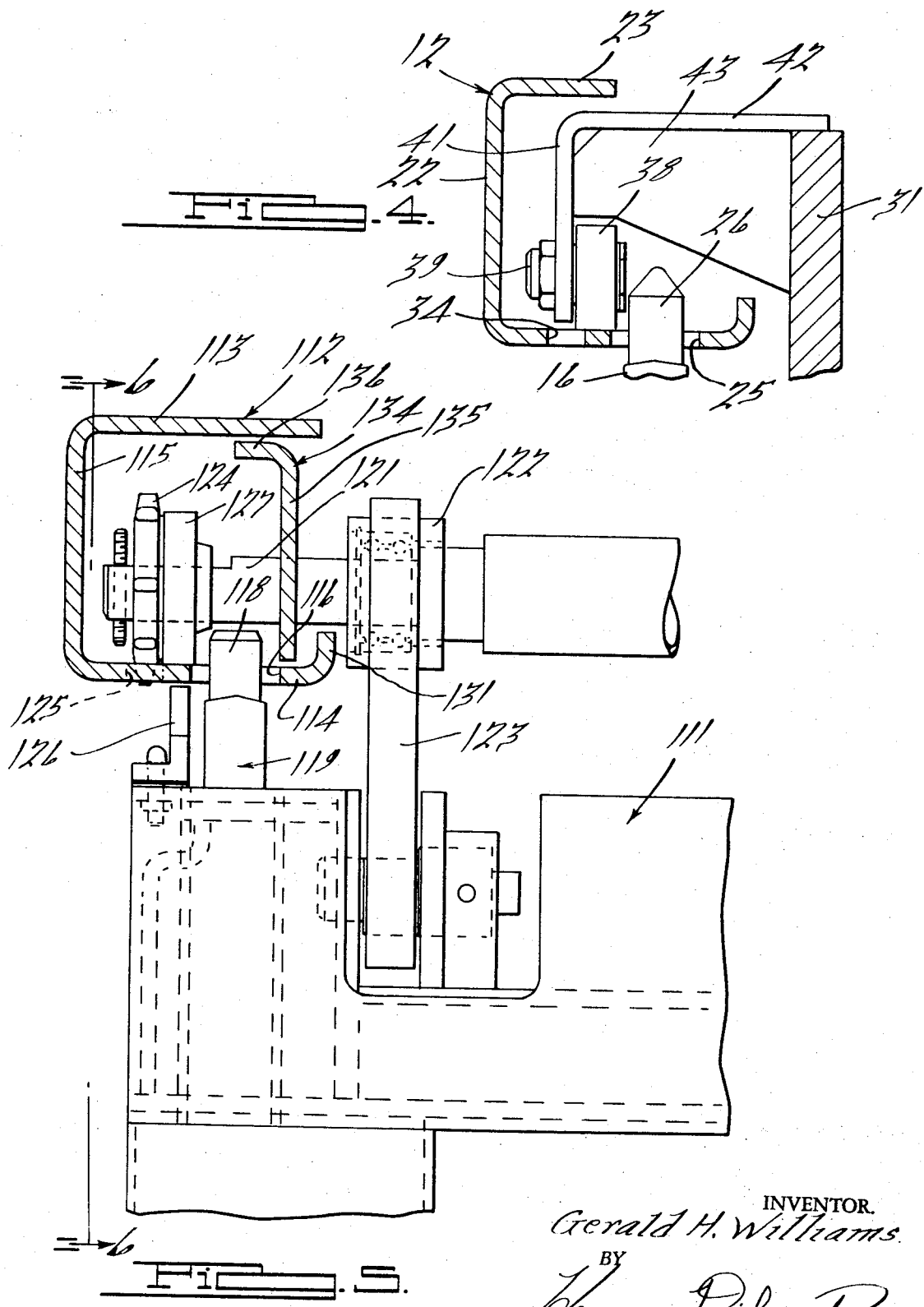

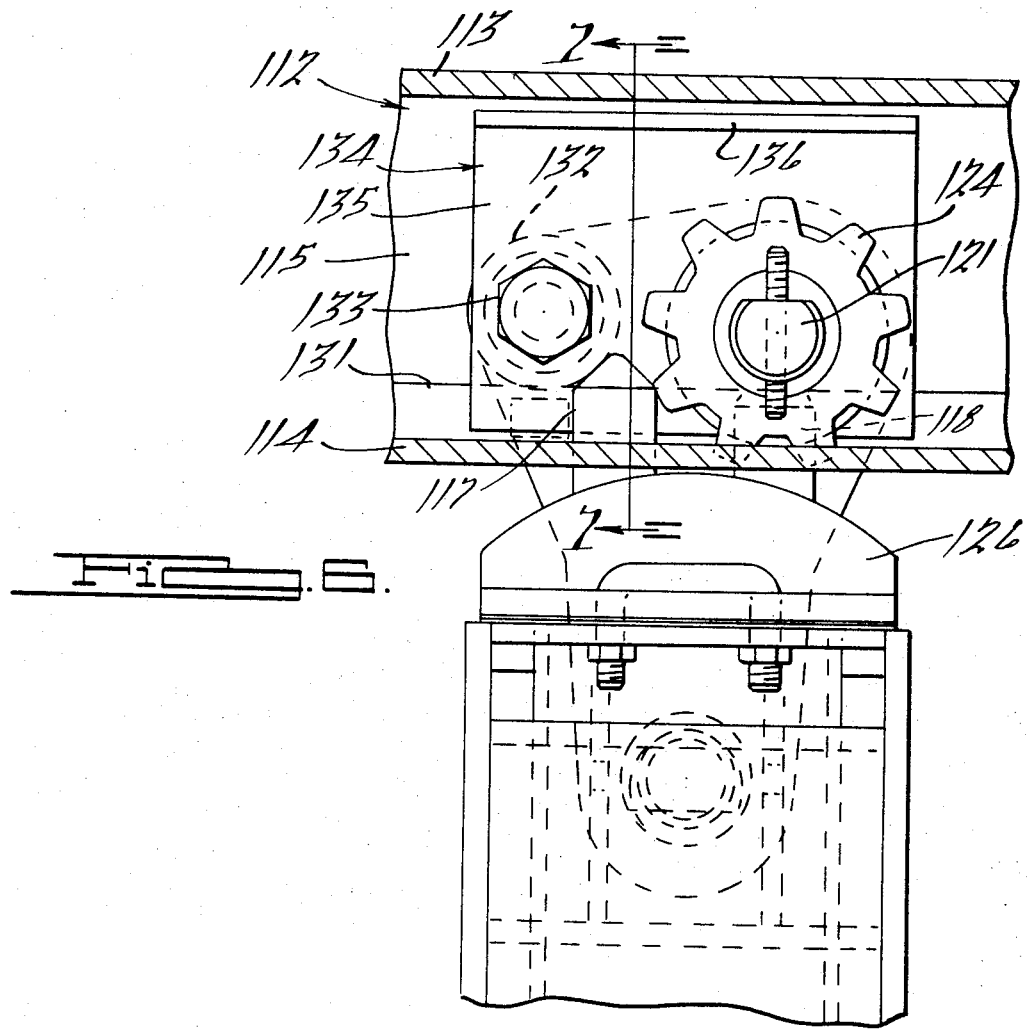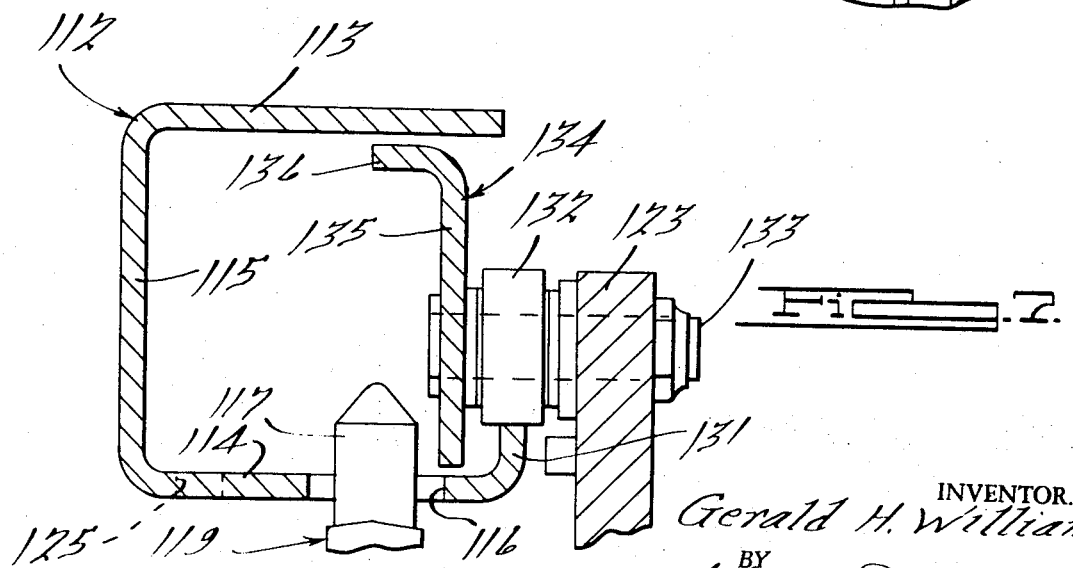

_3,741,127_

TROLLEY SYSTEM FOR FREIGHT BRACING BULKHEAD ASSEMBLIES

BACKGROUND OF THE INVENTION

This invention relates to a trolley system for freight bracing bulkhead assemblies and more particularly to improved trolley systems that preclude accidental falling of the bulkhead assembly from the overhead supporting tacks.

In the freight transportation field various systems have been proposed for holding the shipped freight against movement during transit. One of the better known types of such bracing devices is the bulkhead assembly. These assemblies comprise large doors or bulkheads that are supported for movement along the length of the vehicular cargo area upon overhead crane rails or tracks. A trolley structure is normally used for supporting the bulkhead assemblies upon these tracks. This supporting arrangement should permit free movement of the bulkhead assembly to preselected bracing positions. The structure should also insure against inadvertent displacement of the trolley structure from the rails and attendant falling of the bulkhead assembly. Various arrangements have been proposed for this purpose.

It is, therefore, a principal object of this invention to provide an improved and simplified trolley system for a freight bracing bulkhead assembly.

It is another object of the invention to provide a bulkhead trolley system that will insure against inadvertent disengagement from the supporting crane rails.

SUMMARY OF THE INVENTION

This invention is adapted to be embodied in a freight bracing bulkhead assembly that is supported for movement in a cargo area between selected freight bracing positions upon a pair of spaced tracks. The bulkhead assembly includes a bulkhead and a pair of locking members that are supported at the opposite upper edges of the bulkhead for movement between a locked position and a released position. The locking members have means adapted to cooperate with the tracks when the locking means are in their locked positions for retaining the bulkhead in position. Roller means are carried by the bulkhead at its opposite upper edges outwardly of the center of the bulkhead from the respective locking members. These roller means are also adapted to engage the tracks for supporting the bulkhead for movement along the tracks.

Another feature of the invention is adapted to be embodied in a freight bracing bulkhead assembly of the type generally described in the immediately preceding paragraph. With such an arrangement the track has a pair of spaced apart legs and the roller means are adapted to engage one of these legs. The support for the roller means includes an element that is juxtaposed to the other of the legs of the track so as to preclude disengagement of the roller means from the track.

Yet another feature of the invention is also adapted to be embodied in a freight bracing bulkhead assembly. In connection with this embodiment the track has a pair of angularly disposed legs. The locking members of the bulkhead coact with one of the legs and the roller means are supportingly engaged with the other track leg.

BRIEF DESCRIPTION OF THE DRAWINGS

FIG. 1 is a perspective view, with a portion broken away, of a freight bracing bulkhead assembly construction in accordance with a first embodiment of the invention.

FIG. 2 is an enlarged view of the upper left-hand corner of the bulkhead assembly shown in FIG. 1 with a further portion broken away.

FIG. 3 is a cross sectional view take along the line 3—3 in FIG. 2.

FIG. 4 is a cross sectional view taken along the line 4—4 of FIG. 3.

FIG. 5 is a view, in part similar to FIG. 2, showing a second embodiment of the invention.

FIG. 6 is a cross sectional view taken along the line 6—6 of FIG. 5.

FIG. 7 is a cross sectional view taken along the line 7—7 of FIG. 6.

DETAILED DESCRIPTION OF THE PREFERRED EMBODIMENTS

The Embodiment of FIGS. 1 through 4

A freight bracing bulkhead assembly constructed in accordance with a first embodiment of the invention is identified generally by the reference numeral 11. The bulkhead assembly 11 is particularly adapted for bracing freight during transportation in a vehicle such as a railroad car. The bulkhead assembly is supported for movement along the car upon a pair of overhead tracks or crane rails 12 and 13 in a manner which will become more apparent as this description proceeds. As will also become apparent, the bulkhead assembly 11 includes a locking structure that cooperates with the crane rails 12 and 13 and with a pair of floor mounted tracks 14 and 15 for locking the bulkhead assembly in preselected bracing positions. This locking structure includes upper locking pin forgings 16 and 17 and lower locking pin forgings 18 and 19, positioned at their respective corners of the bulkhead assemblies. The locking pin forgings 16, 17, 18 and 19 are operated simultaneously by means of any type of actuating mechanism known in the art. The lower locking pin forgings 18 and 19 have downwardly extending pin portions that are adapted to enter pairs of spaced openings 21 formed in the floor tracks 14 and 15. In a like manner, the upper locking pin forgings 16 and 17 have a corresponding cooperation with the crane rails 12 and 13 as is clearly shown in FIGS. 2 through 4. These figures show the structure at the upper left-hand side of the bulkhead assembly. The construction at the upper right-hand side is the same and for this reason will not be described in detail.

Referring now specifically to FIGS. 2 through 4, the crane rail 12 has a generally C-shape that is comprised of a vertically extending leg 22, a short, horizontally extending upper leg 23 and a longer, horizontally extending lower leg 24. The leg 23 is adapted to be affixed to the roof structure of the associated vehicle in any known manner. The leg 24 is provided with pairs of spaced openings 25 into which pin portions 26 and 27 of the locking pin forging 16 are adapted to extend when the forging 16 is in its locked position. When in its released position, the pin projections 26 and 27 are clear of the apertures 25 so as to permit free movement of the bulkhead assembly 11. As may be seen from an inspection of FIGS. 2 and 3, the pin projection 27 is truncated, for a reason which will become more apparent as this description proceeds.

A trolley or timing shaft 28 extends across the upper edge of the bulkhead assembly 11 and is journaled at its opposite ends in bearings 29. The bearings 29 are each affixed to a supporting plate 31 which supporting plate is adjustably connected to the bulkhead assembly in a manner to be described. Sprocket wheels 33 are non-rotatably affixed to the opposite ends of the timing shaft 28 and have teeth that are engaged with apertures 34 formed in the track leg 24 outwardly from the center of the bulkhead assemblies from the apertures 25. Adjacent the apertures 34, the sprocket wheel 33 is formed with a roller portion 35 that supportingly engages the upper surface of the track leg 24. The sprocket wheels 33 coact with the tracks 12 and 13 to establish a timing relationship between opposite sides of the bulkhead assembly 11 and to assure against cocking of the bulkhead assembly 11 as it is moved along the cargo area, as is well known in the art. Because the sprocket wheels 33 are disposed outwardly from the center of the bulkhead assembly 11 relative to the locking pin forgings 16 and 17 insurance will be provided that the sprocket wheels do not become inadvertently displaced from the track openings 34. The timing shaft 28 is aligned with the locking pin projection 27 and for this reason the projection 27 is truncated so as to preclude interference.

To further prevent inadvertent displacement of the sprocket wheels 33 from the track leg 24 a safety member 37 is affixed to the outer peripheral edges of the bulkhead assembly 11 in a position underlying the track leg 24. The safety member 37 prevents upward movement of the bulkhead assembly sufficient to permit the disengagement of the teeth of the sprocket wheels 33 from the track apertures 34.

In order to provide further safety features and to facilitate convenient movement of the bulkhead assembly 11 along the cargo area a second pair of rollers 38 (FIG. 4) engage the track leg 24 at a point longitudinally spaced from the sprocket wheels and rollers 33 and 35. The rollers 38 are journalled on stub shafts 39 which are, in turn, carried by a vertically extending leg 41 of an L-shaped member. The vertically extending leg 41 meets a horizontally extending leg 42 which leg is affixed, as by welding, to the supporting plate 31. The leg 42 closely underlies the track leg 23 and provides further insurance against inadvertent displacement of the trolley shaft sprocket wheels 33 from the tracks 12 and 13. For additional reinforcing, a gusset plate 43 may be welded to the L-shaped member having the legs 41 and 42 on to the plate 31.

The adjusting plate 31 is formed at its lower end with a cylindrical bore 44 through which a complementarily shaped portion 45 of an adjusting shaft 46 extends. The adjusting shaft 46 has cylindrical portions 47 and 48 disposed on opposite sides of the portion 45 which portions are journalled in plates 49 and 51 of the bulkhead assembly. The axes of the cylindrical portions 47 and 48 are eccentrically disposed relative to the axis of the portion 45. As a result, rotation of the adjusting shaft 46 will change the distance between the main portion of the bulkhead assembly 11 and the elements carried at the upper end of the plate 31; that is the sprocket wheel 33 and rollers 35 and 38. This adjustment may be made to compensate for installation misalignment of the crane rails 12 and 13. The adjustment is made by rotating the shaft 46 by engaging a suitable tooling with a flattened portion 52 of the adjusting shaft. The adjusting shaft is located in its adjusted position by means of a set screw 53.

The Embodiment of FIGS. 5 through 7

A second embodiment of the invention is adapted for use in a bulkhead assembly in connection with its supporting arrangement. Only the upper left-hand corner of this embodiment has been illustrated in FIGS. 5 through 7 since except for the upper support this embodiment is the same as that previously described.

The bulkhead assembly 111 is supported from an overhead pair of tracks, only one of which is shown and which identified generally by the reference numeral 112. The track 112 has spaced horizontally extending legs 113 and 114 which are joined by a vertically extending leg 115 so as to provide a generally C-shape for the track 112. The track leg 114 has spaced pairs of apertures 116 into which projections 117 and 118 of a locking pin forging, indicated generally by the reference numeral 119, are adapted to extend when the locking pin forging is in its locked position.

As in the preceding embodiment, the pin projection 118 is truncated so as to clear a timing shaft 121. The timing shaft 121 is journaled in bearings 122 carried by adjusting plates 123 that are adjustably connected to the bulkhead assembly 111 in the same manner as in the previously described embodiment. Because this structure is the same, it will not be described again in detail.

Sprocket wheels 124 are non-rotatably affixed to the opposite ends of the timing shaft 121 and have teeth that engage apertures 125 in the track legs 114. The apertures 125 are disposed outwardly from apertures 116 from the center of the bulkhead assembly 111. A safety member 126 is affixed to the bulkhead assembly 111 and underlies the track leg 114 so as to prevent disengagement of the teeth of the sprocket wheel 124 from the track leg apertures 125. A roller section 127 is also formed adjacent the sprocket wheel 124 for supportingly engaging the upper surface of the track leg 114.

The inner edge of the track leg 114 is formed with an upstanding projection 131. A roller 132 (FIG. 7) is engaged with the upstanding projection 131 at a point longitudinally offset from the axis of the timing shaft 121. The roller 132 is journaled on a stub 133 which is, in turn, affixed to the plate 123. The cooperation of the roller 132 with the track leg 131 provides further rolling support for the bulkhead assembly 111 and further insurance against cocking.

A safety member, indicated generally by the reference numeral 134 is carried by the shafts 133 and 121. The safety member has a vertically extending leg 135 that extends toward the track leg 114 and behind its upturned projection 131 to insure against transverse movement of the bulkhead assembly 111 relative to the track 112. In addition, the member 134 has a short, horizontally extending leg 136 that underlies the track means 113 to further prevent against vertical displacement of the sprocket wheel 124 from the track leg 114.

It is to be understood that the foregoing description is that of preferred embodiments of the invention. Various changes and modifications may be made without departing from the spirit and scope of the invention as defined by the appended claims.

I claim:

1. A freight bracing bulkhead assembly for bracing freight at selected positions in a cargo area and supported for movement between said positions on a pair of spaced longitudinally extending tracks, each of the tracks having a pair of vertically spaced horizontally extending legs, said bulkhead assembly comprising a bulkhead panel, a timing shaft, hanger means for journalling said timing shaft and for supporting said bulkhead panel from said timing shaft, sprocket wheels nonrotatably affixed to the opposite ends of said timing shaft and engaging the lowermost legs of said tracks, safety members affixed to said hanger means and having a first horizontally disposed leg extending from said hanger means in juxtaposition to the lowermost surface of the uppermost track leg for preventing vertical disengagement of said sprocket wheels from said track lowermost legs and a vertically downwardly extending portion formed at the outer terminus of said horizontally extending portion, and roller means journaled by said vertically extending portion of said safety means and engaging said lowermost track legs for assisting in the suspension of said bulkhead hanger from said tracks.

2. A freight bracing bulkhead assembly as set forth in claim 1 further including locking members supported at the opposite upper edges of the bulkhead panel for movement between a locked position and a released position, said locking members having means adapted to cooperation with means on the tracks when said locking members are in their locked positions for retaining said bulkhead assembly in position.

3. The freight bracing bulkhead assembly of claim 2 wherein the locking members comprise locking pins aligned with the axis of the timing shaft.

4. The freight bracing bulkhead assembly of claim 3 wherein the locking pins aligned with the timing shaft are truncated to clear said timing shaft and further including second locking pins spaced from the first locking pins.

5. A freight bracing bulkhead assembly as set forth in claim 1 wherein the hanger means is adjustably connected to the bulkhead panel for simultaneously adjusting the position of the timing shaft, the sprocket wheels and the roller means relative to said bulkhead panel.

* * * * *